United States Patent [19]
Spencer

[11] 3,782,473
[45] Jan. 1, 1974

[54] HORSESHOE
[76] Inventor: Dudley W. C. Spencer, 619 Shipley Rd., Wilmington, Del. 19809
[22] Filed: May 12, 1972
[21] Appl. No.: 252,546

Related U.S. Application Data
[63] Continuation-in-part of Ser. No. 71,121, Sept. 10, 1970, Pat. No. 3,664,428.

[52] U.S. Cl. .................................................. 168/4
[51] Int. Cl. ............................................ A01l 1/00
[58] Field of Search .................... 168/4, 12, 16, 20, 168/21, DIG. 1

[56] References Cited
UNITED STATES PATENTS
3,524,505  8/1970  Ross ............................. 168/DIG. 1
2,024,265  12/1935  Anderson et al. ..................... 168/4

Primary Examiner—Louis G. Mancene
Assistant Examiner—J. Q. Lever
Attorney—Arthur G. Connolly et al.

[57] ABSTRACT

A horseshoe comprises a U-shaped shoe unit which is secured to the hoof by thermo-adhesive means and which includes heat conductive metal means in contact with the adhesive means for curing the adhesive when the metal is heated.

7 Claims, 27 Drawing Figures

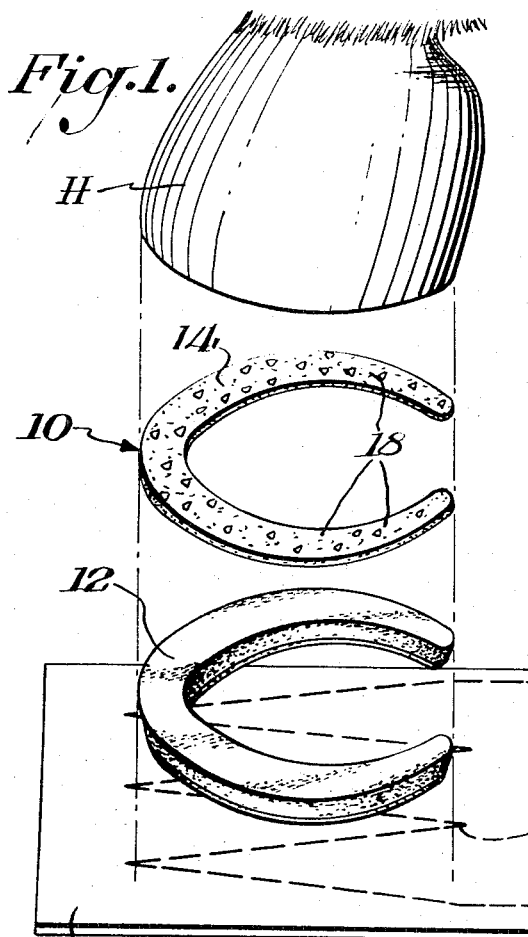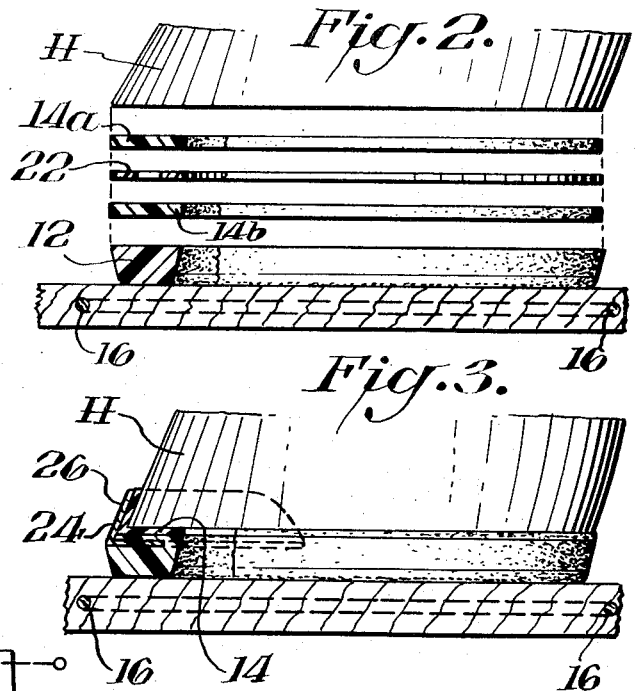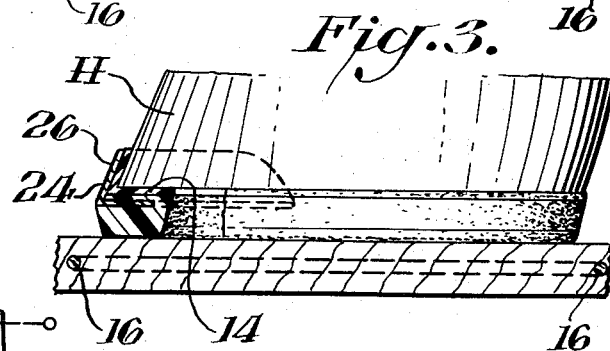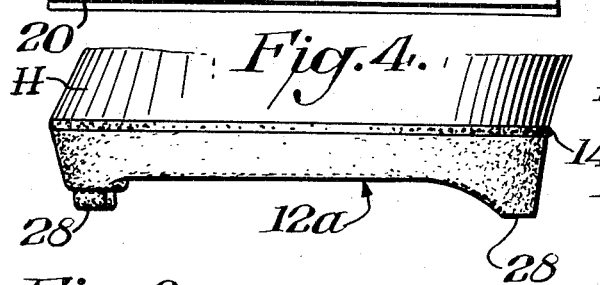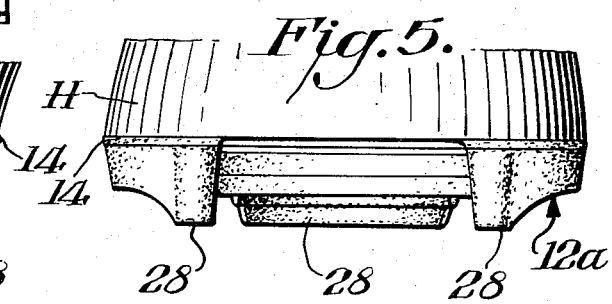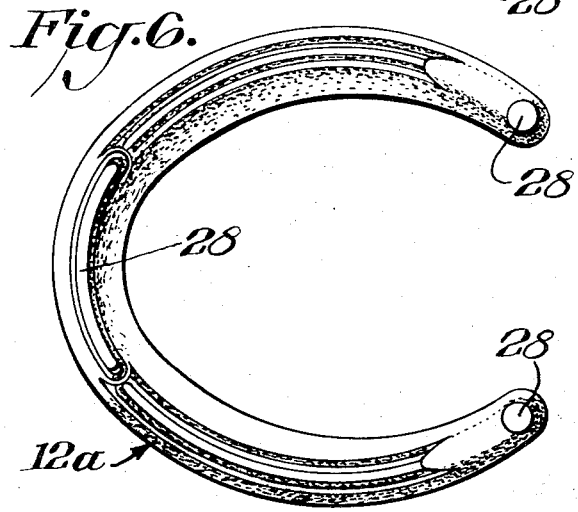

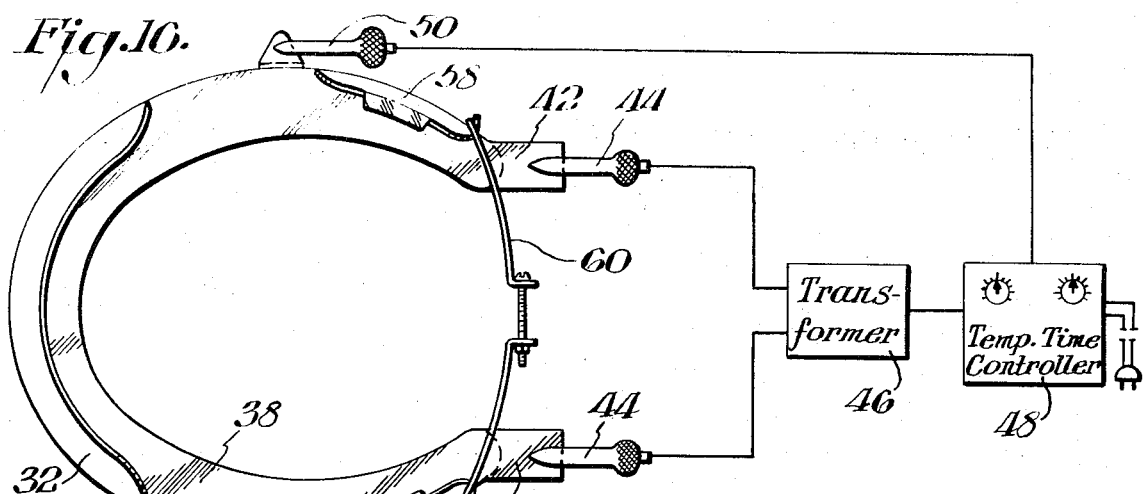
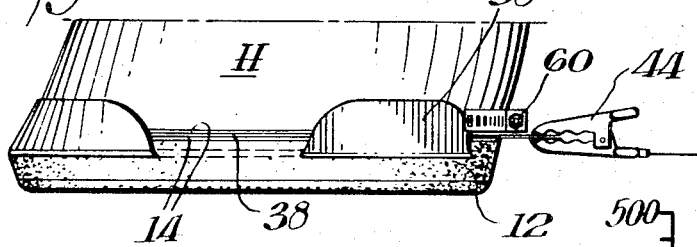
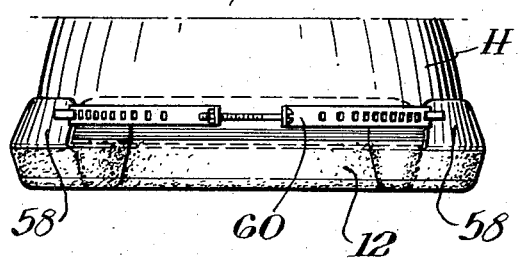
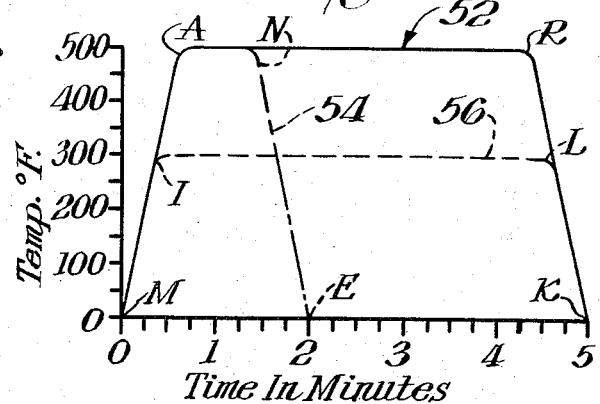
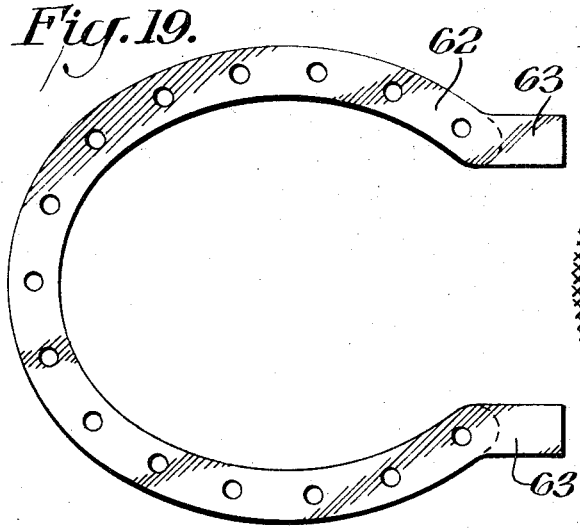
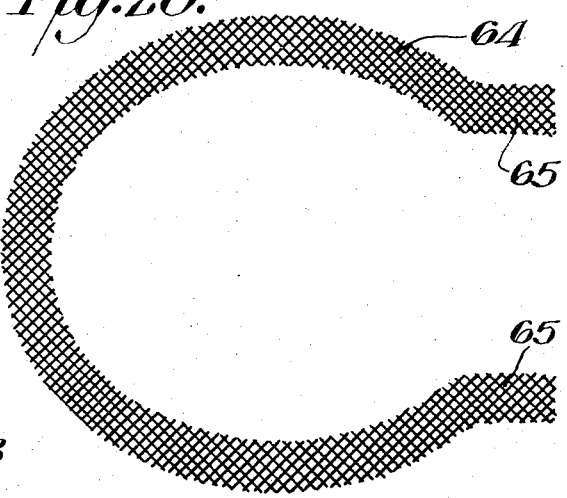

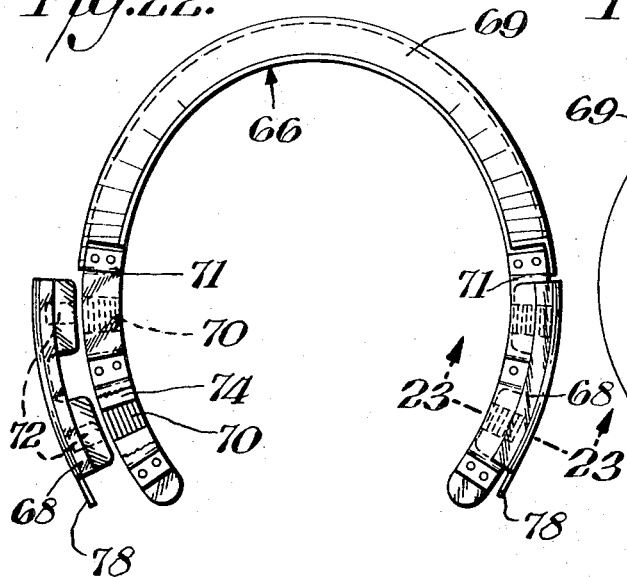
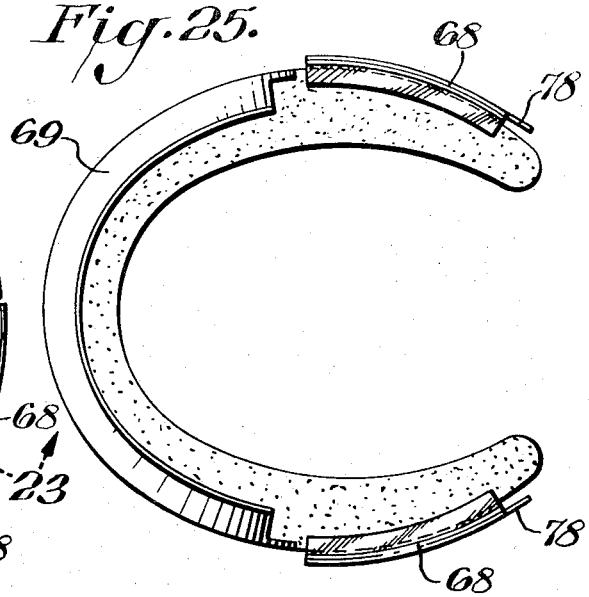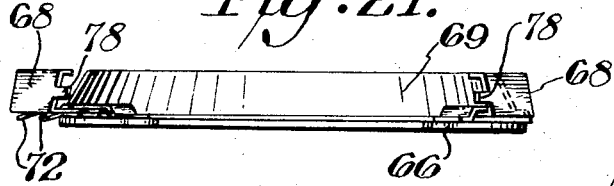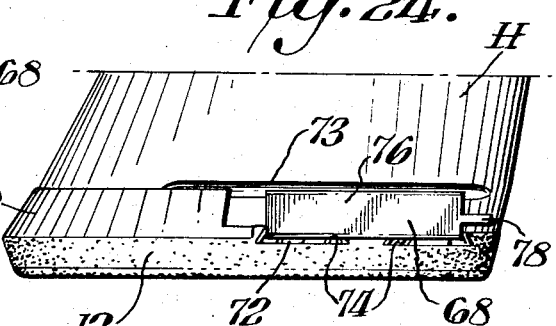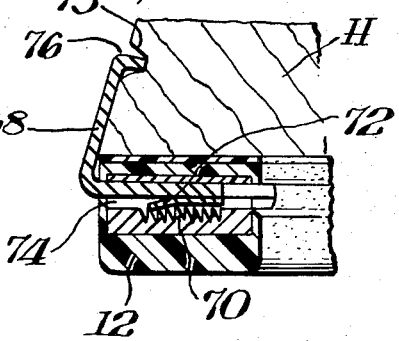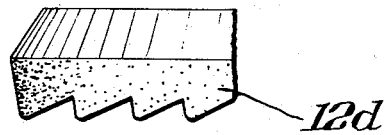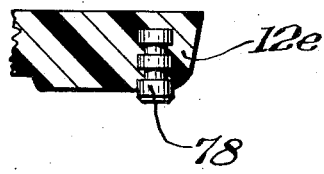

3,782,473

HORSESHOE

CROSS-REFERENCE TO RELATED APPLICATION

This application is a continuation-in-part of copending application Ser. No. 71,121; filed Sept. 10, 1970.

BACKGROUND OF THE INVENTION

Parent application Ser. No. 71,121; filed Sept. 10, 1970, now U.S. Pat. No. 3,664,428, the details of which are incorporated herein of reference thereto, discloses improvements in horseshoe manufacturing techniques wherein a metal frame is utilized for curing the adhesive incorporated in the horseshoe In the various embodiments illustrated in that application the metal frame is heated by means of tabs at the free ends of the U-shaped frames which are particularly adaptable for being electrically heated. Although the various procedures described in that application are quite advantageous it would also be desirable to apply the concepts of that application to means whereby a metal frame is not necessary to effect a curing of the adhesive.

SUMMARY OF THE INVENTION

An object of this invention is to provide alternative methods of curing the adhesives within the concepts set forth in the parent application.

In accordance with this invention the adhesive means includes heat conductive metal means in contact therewith for curing the adhesive when the metal means is heated. The metal means is disposed sufficiently close to the edge of the U-shaped shoe so as to be receptive to the heat source.

In accordance with one aspect of this invention the heat source is an induction heating coil and the metal means may take various forms such as metal particles disposed throughout the adhesive or may be a perforated metal plate or foil or simply a metal frame.

In accordance with another aspect of this invention the heat source is resistive heating means and the metal means includes, for example, tabs to which the heat source may be coupled. Again the metal means may take various forms.

THE DRAWINGS

FIG. 1 is an exploded view of a horseshoe made in accordance with one aspect of this invention;

FIG. 2 is an exploded view in section of a modified form of this invention;

FIG. 3 is a cross-sectional view in elevation of a further form of this invention;

FIGS. 4-5 are side and rear elevation views of a modified horseshoe made in accordance with this invention;

FIG. 6 is a bottom plan view of the horseshoe shown in FIG. 5;

FIG. 15 is a side elevation view of still another embodiment of this invention;

FIG. 16 is a top plan view of the embodiment of the invention shown in FIG. 15;

FIG. 17 is a rear elevation view of the embodiment of the invention shown in FIGS. 15-16;

FIG. 18 is a graph showing the variables possible with respect to time and temperature in accordance with the practice of this invention;

FIGS. 19-20 are top plan views of metal plates usable in accordance with this invention;

FIG. 21 is a rear elevation view of a frame used yet with another horseshoe formed in accordance with this invention;

FIG. 22 is a top plan view of the frame shown in FIG. 21;

FIG. 23 is a cross-sectional view taken through FIG. 22 along the line 23—23 but showing the horseshoe secured to a hoof;

FIG. 24 is a side elevation view of the horseshoe shown in FIG. 23;

FIG. 25 is a top plan view of the horseshoe shown in FIG. 24;

FIG. 26 is a side elevation view of the portion of a modified form of horseshoe; and FIG. 27 is a cross-sectional view of the portion of yet another modified form of horseshoe.

DETAILED DESCRIPTION

Figure 8:
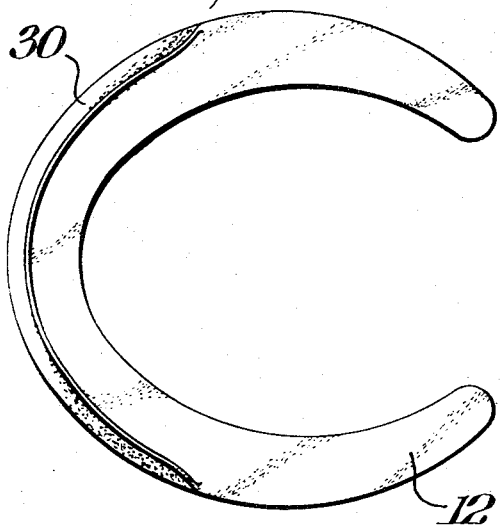
FIGS. 8 and 9 are top plan and rear elevation views of the shoe shown in FIG. 7.

The present invention further effectuates the concepts disclosed in parent application Ser. No. 71,121; filed Sept. 10, 1970 (the details of which are incorporated herein by reference thereto) wherein a metal frame is utilized to effect the curing of thermoadhesive. The present invention is directed to variations of this concept which in general include utilizing induction heating means or resistive heating means with the horseshoe being mounted on the hoof in various forms rather than requiring that a metal frame be utilized to mount the horseshoe until the adhesive has cured.

As shown in FIG. 1 in accordance with one aspect of this invention the horseshoe comprises a U-shaped unit 10 which includes a U-shaped wear member or shoe 12 In general the invention includes the provision of metal means in contact with the adhesive means and disposed sufficiently close to the edge of the No. 71,121 for mounting conductive metal. on the hoof H. An induction heating coil 16 is provided in a support surface 20 to provide the necessary heating source for effectuating the concepts of this invention. In general the invention includes the provision of metal means in contact with the adhesive means and disposed sufficiently close to the edge of the U-shaped unit to be receptive to heat from the heat source. As illustrated in FIG. 1, the metal means is a plurality of metal particles 18 scattered throughout the adhesive layer 14. In practice the wear member 12 is placed upon support surface 20 over induction coil 16 and the adhesive layer 14 is placed on member 12. The horse's hoof is then placed directly on adhesive layer 14 with the induction coil being activated to create the necessary heat for curing adhesive layer 14. This curing is rapidly effected by the provision of the heat conductivemetal. The induction heating is particularly advantageous because it provides instantaneous heating, eliminates a warm-up period, and quickly dissipates heat after curing.

The metal means may take various forms within the concepts of this invention. For example in the embodiment illustrated in FIG. 2 the metal means 22 is perforated U-shaped plate or foil disposed between adhesive layers 14a, 14b. Similarly, in the embodiment shown in FIG. 3 the metal means 24 is a metal frame which includes an upstanding rim 26 similar to the parent application.

The concepts of this invention may also be applied to various forms of horseshoes. Thus in the embodiment illustrated in FIGS. 4–6 a horseshoe particularly suitable for race horses is illustrated wherein the wear member 12a has three relatively narrow contact surfaces 28 with substantial open areas therebetween.

Figure 7:
FIG. 7 is a side elevation view of a horseshoe in accordance with a further embodiment of this invention.
Figure 9:
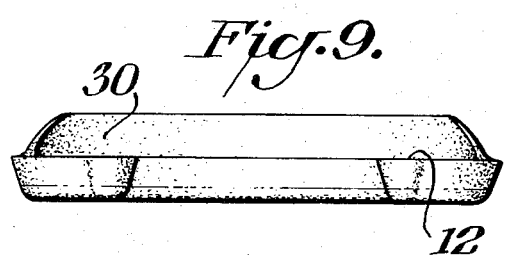

FIGS. 7–9 show a form of horseshoe wherein a lip 30 made of cushioning material is integrally molded with rear member 12. Suitable adhesive means and metal means would be placed in contact with the wear member as previously described.

Figure 10:
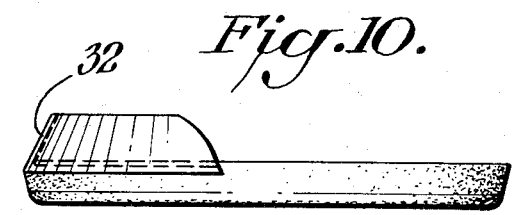
FIG. 10 is a side elevation view of a further horseshoe in accordance with this invention.

FIG. 10 shows yet another form of this invention wherein a lip 32 is provided similar to that shown in FIGS. 7–9 but the lip is made of metal.

Figures 12, 13:
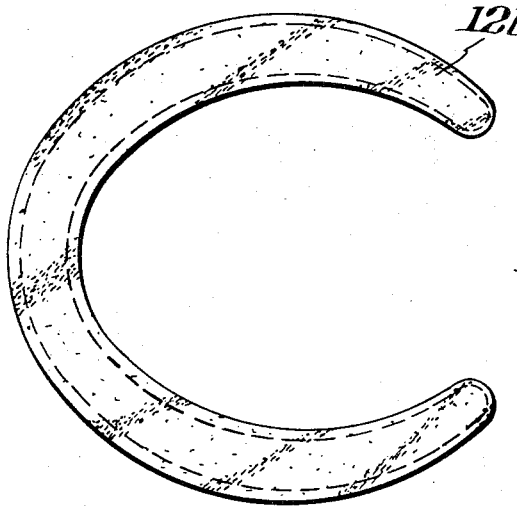
FIG. 12 is a top plan view of the horseshoe shown in FIG. 11.
FIG. 13 is a top plan view of a horseshoe in accordance with another aspect of this invention.
Figure 11:
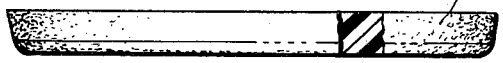
FIG. 11 is a side elevation view partly in section of a horseshoe in accordance with yet another aspect of this invention.
Figure 14:
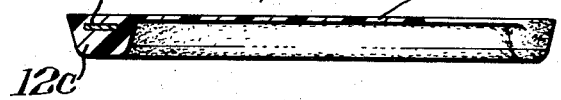
FIG. 14 is a cross-sectional view taken through FIG. 13 along the line 14—14.

FIGS. 11–12 show yet another form of this invention wherein the wear member 12b is completely flat and rimless. FIGS. 13–14 show a similar wear member 12c which, however, includes an integral web 34 for coming into direct contact with the hoof. Advantageously, the web 34 would accommodate not only the adhesive means but also a suitable medicament. For example the phenol adhesive may include a bacteriolical suppressant to keep the foot clean. FIG. 14 further illustrates a ramification of this invention wherein the shoe or wear member 12c includes a metal insert 36 for imparting the desired shape to the wear member.

FIGS. 15–17 illustrate a further embodiment of this invention which utilizes resistive heating means as the heating source. As indicated therein a metal foil or plate 38 is provided over the shoe or wear member 12 and plate 38 includes tabs 42 to which are electrically coupled by detachable couplers 42 to a suitable heat source including, for example, transformer 46 with a timed temperature controller 48 associated therewith. Suitable thermocouple 50 connects the time and temperature controller 48 to metal member 38. Thus, it is possible to accurately control the heating rate, the period during which the heat is applied, and the cooling rate. As illustrated in FIG. 18, for example, heating curve 52 indicated in solid line joining points MARK exemplifies one possible heating schedule usable with this invention. FIG. 18 also exemplifies alternative heating indicated by the dotted lines 54 (joining points MANE) and 56 (joining joints MILK). Accordingly, through the use of controller 48 it is possible to adjust both the duration of the heating cycle (curve 54) or the maximum temperature achieved thereby (curve 56). It is to be further understood that a suitale time and temperature controlling arrangement such as illustrated in FIG. 16 may also be provided with the induction heating arrangement previously described.

In the embodiments shown in FIGS. 15–17 temporary mounting means are provided in the form of rim portions 58 which are secured to the U-shaped unit by any suitable means, with a detachable clamping arrangement 60 spanning the rim portions. After the adhesive has been set the clamping arrangement 60 and rim portions 58 may be removed. Rim portions 58 may either be detachable or may be permanently attached as later described with respect to FIGS. 21–25. It is also understood that the various mounting arrangements shown with respect to the resistance heating may be used with induction heating and vice versa.

As previously indicated various forms of metal means may be utilized in accordance with this invention. Thus, FIG. 19 illustrates a perforated metal plate or foil 62 having tabs 63, while FIG. 20 illustrates a wire mesh metal screen 64 having tabs 65.

FIGS. 21–25 illustrate an embodiment of this invention wherein the metal means or frame 66 is particularly designed to receive detachable rims 68 similar to the embodiment of FIGS. 15–17 except that rims 68 eventually are permanently mounted. As illustrated therein frame 66 includes spaced ratchet teeth 70 in a slot 74, while rims 68 include downwardly projecting spring fingers 72 which are engaged by the ratchet teeth 70 to lock the rims 68 in place with respect to metal rim 66. Thus as is readily apparent rims 68 are easily movable in one direction but are prevented from movement in the opposite direction.

With the arrangement thus shown in FIGS. 21–25 a shoe is provided which simplifies the shoeing procedure for the farrier and also permits the temporary lock provided by rim portions 68 to become permanent. As is apparent from FIG. 25 rim 69 of frame 66 covers the toe of the hoof but does not extend beyond the lateral center line. Thus the farrier may slip the shoe on and off as many times as necessary to assure a proper fit without springing or distorting the shoe. The springiness of the shoe is controlled by part 71 which can be engineered for the deflection demanded by the hoof action and not by the farrier fitting requirements. The fit in the rear portion of the shoe is initially provided by dummy parts which correspond to rim portions 68 but do not include locking spring finger or leaf spring 72. The farrier makes the small indentation or groove 73 in the hoof wall with his rasp into which he fits the dummy locks. The dummy parts permit the farrier to install and remove the locks to assure a proper fit. When a proper fit is achieved the farrier removes the entire shoe from the hoof and applies adhesive to the interior of the shoe including the permanent locks or rim members 68. The farrier then puts the show on the hoof, slides rim member 68 into slots 74 of the frame 66 and a permanent lock is thereby effectuated by the ratchet and pawl action resulting from spring finger 72 reacting against teeth 70. Flanges 76 of rim portions 68 are also engaged in groove 73 of the hoof. The lock or rim portion 68 thus functions as a temporary lock while the adhesive is setting and becomes a permanent lock after the adhesive has set. Electrical tabs 78 are also integral with the locking device 68 and can be snapped off or hammered flat after they have fulfilled their function. In some applications locks 68 are so effective that an electric heat setting may not be necessary since the locks may hold the shoe in place long enough for the adhesive to cure at room temperature.

FIG. 26 illustrates a further ramification of this invention wherein one wear member 12d is rippled to provide better traction in the mud, while FIG. 27 illustrates an embodiment wherein the wear member 12e includes studs 78 for providing better traction in the snow.

Various modifications may be made to this invention without departing from the spirit thereof. Thus, for example, a shoe such as illustrated in FIGS. 11–12 may be used as a race shoe but made quite thin such as 1/16 inch thick. Such a shoe could be secured to the hoof by incorporating metal particles in the adhesive and by using any suitable permanent or detachable mounting means to hold the shoe (or perhaps more properly the "slipper") on the hoof until the adhesive has set. Such a shoe would provide the necessary protection to the hoof, while giving the horse the sense of feeling as if there were no shoe on the hoof.

What is claimed is:

1. A horseshoe for covering the wear surface of a hoof comprising a U-shaped shoe unit for fitting on the hoof of a horse, said unit comprising a U-shaped wear member, thermoadhesive means, and heat conductive metal means in contact with said adhesive means for curing said adhesive means when said metal means is heated, and said metal means being disposed sufficiently close to the edge of said unit to be receptive to heat from a heat source, said heat source being resistance heating means coupled to said metal means, the legs of said U-shaped unit being rimless, removable coupling means attached to said legs, said removable coupling means comprising an upstanding rim portion detachably secured to the outer portion of each leg, and a removable fastener secured to said rim portions.

2. A horseshoe for covering the wear surface of a hoof comprising a U-shaped shoe unit for fitting on the hoof of a horse, said unit comprising a U-shaped wear member, thermoadhesive means, and heat conductive metal means in contact with said adhesive means for curing said adhesive means when said metal means is heated, and said metal means being disposed sufficiently close to the edge of said unit to be receptive to heat from a heat source, said heat source being resistance heating means coupled to said metal means, said metal means being a U-shaped perforated plate having its free ends extending beyond the remainder of said unit, and said resistance means being coupled to said free ends of said plate.

3. A horseshoe for covering the wear surface of a hoof comprising a U-shaped shoe assembly for fitting on the hoof of a horse, said assembly comprising a U-shaped wear member, a heat conductive securing unit disposed for directly contacting the hoof with the wear member remote therefrom, said unit comprising thermoadhesive means, and heat conductive metal means in intimate contact with said adhesive means for curing said adhesive means when said metal means is heated, said metal means comprising metal particles embedded in said adhesive means and dispersed throughout, and said heat source being an induction coil whereby the heat from said induction coil is transmitted to said metal means and said heated metal means thereby permits the instantaneous heating of said adhesive means to quickly adhere said shoe assembly to the hoof and permit said assembly to be secured to the hoof while the hoof is in a normal upright position.

4. The shoe of claim 3 wherein said shoe unit is about 1/6 inch thick.

5. The shoe of claim 3 including time and temperature control means connected to said metal means.

6. A horseshoe for covering the wear surface of a hoof comprising a U-shaped shoe assembly for fitting on the hoof of a horse, said assembly comprising a U-shaped wear member, a heat conductive securing unit disposed for directly contacting the hoof with the wear member remote therefrom, said unit comprising thermoadhesive means, and heat conductive metal means in intimate contact with said adhesive means for curing said adhesive means when said metal means is heated, said adhesive means comprising a pair of layers of adhesive, said metal means being a perforated metal plate between said layers of adhesive, and said heat source being an induction coil whereby said assembly may be placed on top of said coil with the hoof of the horse placed thereon in the normal upright position and said coil may quickly heat said perforated plate to thereby cause both of said layers of adhesive above and below said plate to melt and thus secure said assembly to the hoof while the hoof is in a normal upright position.

7. The shoe of claim 6 including time and temperature control means connected to said metal means.

* * * * *

PO-1050
(5/69)

UNITED STATES PATENT OFFICE
CERTIFICATE OF CORRECTION

Patent No. 3,782,473            Dated January 1, 1974

Inventor(s) DUDLEY W. C. SPENCER

It is certified that error appears in the above-identified patent and that said Letters Patent are hereby corrected as shown below:

Column 1, line 13, after "horseshoe" insert --- . ---

Column 2, line 48 to line 51, delete "In general ... metal." and insert --- made of any suitable cushioning material such as available thermo-elastics or elastomerics and U-shaped adhesive means 14 of the type disclosed in parent application Serial No. 71,121 for mounting ---

Column 2, last line, "conductivemetal" should be --- conductive metal ---

Column 3, line 59, "suitale" should be --- suitable ---

Column 6, line 19, "1/6" should be --- 1/16 ---

Signed and sealed thid 9th day of July 1974.

(SEAL)
Attest:

McCOY M. GIBSON, JR.
Attesting Officer

C. MARSHALL DANN
Commissioner of Patents